US012655683B2

(12) United States Patent
Hillmer et al.

(10) Patent No.: US 12,655,683 B2
(45) Date of Patent: Jun. 16, 2026

(54) LIGHTING MODULE FOR A BUILDING FACADE

(71) Applicant: NANOSCALE GLASSTEC GMBH, Kassel (DE)

(72) Inventors: Hartmut Hillmer, Kassel (DE); Guilin Xu, Kassel (DE)

(73) Assignee: NANOSCALE GLASSTEC GMBH, Kassel (DE)

(*) Notice: Subject to any disclaimer, the term of this patent is extended or adjusted under 35 U.S.C. 154(b) by 133 days.

(21) Appl. No.: 18/568,054

(22) PCT Filed: May 12, 2022

(86) PCT No.: PCT/EP2022/062940
§ 371 (c)(1),
(2) Date: Dec. 7, 2023

(87) PCT Pub. No.: WO2022/258301
PCT Pub. Date: Dec. 15, 2022

(65) Prior Publication Data
US 2024/0271484 A1 Aug. 15, 2024

(30) Foreign Application Priority Data
Jun. 10, 2021 (EP) .................................... 21178674

(51) Int. Cl.
*E06B 9/264* (2006.01)
*E06B 9/24* (2006.01)

(52) U.S. Cl.
CPC ...... *E06B 9/264* (2013.01); *E06B 2009/2464* (2013.01); *E06B 2009/2476* (2013.01); *E06B 2009/2643* (2013.01)

(58) Field of Classification Search
CPC ..... E06B 2009/2464; E06B 2009/2476; E06B 2009/2643; E06B 9/264
See application file for complete search history.

(56) References Cited

U.S. PATENT DOCUMENTS 3,989,357 A * 11/1976 Kalt ....................... G02B 26/02 359/231
4,266,339 A * 5/1981 Kalt .......................... E06B 9/24 29/829

(Continued)

FOREIGN PATENT DOCUMENTS

CN 209620333 U 11/2019
CN 112074644 A 12/2020

(Continued)

OTHER PUBLICATIONS

Hillmer Hartmut et al. "MOEMS micromirror arrays in smart windows for daylight steering" Journal of Optical Microsystems, Society of Photo-Optical Instrumentation Engineers, 1000 20th St. Bellingham WA 98225-6705 USA, vol. 1, No. 1, Jan. 26, 2021 (Jan. 26, 2021), p. 14502, [retrieved on Jan. 26, 2021] DOI: 10.1117/1.JOM.I.I.014502 ISSN: 2708-5260, XP060139330.

*Primary Examiner* — Johnnie A. Shablack
(74) *Attorney, Agent, or Firm* — Dinsmore & Shohl LLP

(57) ABSTRACT

A lighting module for a building facade, in particular for glazing, has front, rear, upper, and lower sides with respect to the arrangement at the façade. The module includes a base panel at the front side and a base panel at the rear side, wherein the base panels are transparent and an intermediate space is formed between the base panel. A plurality of microsheet elements each have an opaque sheet section with a lighting front and/or rear side. Each microsheet element is arranged by a fastening section at a marginal side in the manner of a hinge on the base panel at the front side or on the base panel at the rear side such that each sheet section, starting from a light impermeable closed position, is pivotable about a horizontal pivot axis in the direction of the upper or lower side into at least one light permeable open position.

20 Claims, 12 Drawing Sheets

(56) References Cited

U.S. PATENT DOCUMENTS

| | | | | |
|---|---|---|---|---|
| 4,535,828 | A * | 8/1985 | Brockhaus ............. | B01D 3/346<br>160/DIG. 7 |
| 5,784,189 | A * | 7/1998 | Bozler ............... | G02B 26/0833<br>359/254 |
| 6,590,267 | B1 * | 7/2003 | Goodwin-Johansson ................... | F15C 5/00<br>257/414 |
| 7,684,105 | B2 | 3/2010 | Lamontagne et al. | |
| 10,914,114 | B2 * | 2/2021 | Blush ....................... | B32B 27/06 |
| 11,137,658 | B2 * | 10/2021 | Brown .................. | G01J 1/4228 |
| 11,959,334 | B2 * | 4/2024 | Ribberink ................. | E06B 9/24 |
| 12,359,503 | B2 * | 7/2025 | Tameshtit ................. | E06B 9/42 |
| 2014/0116497 | A1 * | 5/2014 | Sanders .................. | H02S 40/32<br>136/246 |
| 2015/0338713 | A1 | 11/2015 | Brown | |
| 2018/0274292 | A1 * | 9/2018 | Hall ...................... | B32B 27/322 |
| 2018/0301578 | A1 * | 10/2018 | Rozbicki ................. | H02S 30/10 |
| 2024/0271484 | A1 * | 8/2024 | Hillmer ..................... | E06B 9/28 |

FOREIGN PATENT DOCUMENTS

| | | | |
|---|---|---|---|
| JP | 2007-231613 | A | 9/2007 |
| JP | 2012-146792 | A | 8/2012 |
| WO | 2014082092 | A1 | 5/2014 |
| WO | 2014088777 | A1 | 6/2014 |

* cited by examiner

LIGHTING MODULE FOR A BUILDING FACADE

CROSS-REFERENCE TO RELATED APPLICATIONS

This application is the U.S. National Stage of PCT/EP2022/062940 filed on May 12, 2022, which claims priority to European Patent Application 21178674.4 filed on Jun. 10, 2021, the entire content of both are incorporated herein by reference in their entirety.

FIELD OF THE INVENTION

The present invention relates to a lighting module for a building facade, in particular for glazing, and to a system for designing a building facade.

BACKGROUND OF THE INVENTION

Shutter arrays and mirror arrays that are made up of a plurality of actuable microelements in the form of microshutters or micromirrors belong to the so-called microoptoelectromechanical systems (MOEMS) and are used for high resolution light modulation or light guidance in a plurality of different applications, for instance as projector elements, routers, shutters, or blinds, for example in the fields of projection displays, optical information processing, microscopy, lithography, laser structuring, or also as elements conducting sunlight in the glazing of buildings.

The microelements constituting the array are miniaturized optical elements in a size range of a few square micrometers up to square millimeters whose position and thus lighting effect is actuable by means of an active or passive control. The microelements are here selectively configured as purely opaque microshutters or they have a reflective surface as a micromirror. Typical thin film processes are used to manufacture the arrays, in particular using deposition processes, lithographic and etching steps, and sacrificial layer techniques.

Lighting modules having micromirrors based on MOEMS are known in the prior art for active light guidance at a building facade. DE 103 58 967 A1, for example, discloses an array in the form of a micromirror arrangement for purposes of facade construction in which micromirror elements are present in a regular, planar matrix arrangement and are controlled individually or in groups by a central controller over an addressing network. The possibility of active sunlight guidance is thereby provided with high spatial resolution that enables a personalized illumination situation adapted to the requirements in the space disposed behind the facade. Detailed specifications for the production, function, and application principle of such a micromirror array can be found in Hillmer et. al., Jpn. J. Appl. Phys. 57, 08PA07(2018).

Hillmer et al., Journal of Optical Microsystems 1, 014502 (2021) (see also XP060139330) further disclose MOEMS micromirror arrays for daylight guidance in building glazing. The modules based thereon have a front side, a rear side, an upper side, and a lower side with respect to their provided arrangement on the building facade, with the rear side of the modules having to be oriented in the direction of the building interior and with the upper side of the modules at the top. The modules furthermore comprise a base panel at the front side and a base panel at the rear side that are each configured as transparent, with the micromirrors being mounted in an intermediate space between the base panels.

The micromirrors here are arranged in the manner of hinges on the inner side of the base panel at the front side such that every micromirror is pivotable, starting from a light impermeable closed position, about a horizontal pivot axis in the direction of the lower side of the module into at least one light permeable open position. In the closed position, the micromirrors contact the base panel at the front side in a substantially plane parallel manner and reflect incident sunlight back into the outer space of the building facade. If a plurality of micromirrors are moved into their closed positions, an extensive mirroring of the building facade takes place, which can result in light reflections that are so pronounced that, for example, adjacent traffic or neighboring buildings are disruptively impaired. In addition, the rear side of the mirror elements are typically also formed as metallically reflective so that in the closed position of the mirror elements a mirror effect is also produced in the direction toward the rooms located behind the glazing. An extensive inner mirroring of the glazing can, however, disadvantageously be felt as discomforting by persons located in the respected rooms.

The cladding of building facades with lighting modules for the light guidance from the prior art also competes with a use of these areas for photovoltaic energy generation that frequently takes place today by an extensive integration of solar modules in building facades together with their glazing.

SUMMARY OF THE INVENTION

It is therefore the object of the present invention to propose a lighting module for a building facade that overcomes the aforesaid disadvantages of the prior art and is in particular suitable for setting up an individualized system adapted to requirements to design a building facade.

This object is achieved by a lighting module in accordance with claim 1 and by a system based thereon for designing a building facade in accordance with claim 12. Advantageous further developments of the invention are set forth as disclosed herein.

The invention includes the technical teaching that the lighting module has a front side, a rear side, an upper side, and a lower side with respect to the provided arrangement at a building facade and wherein the module at least comprises:

- a base panel at the front side and a base panel at the rear side, wherein the base panels are transparent and wherein an intermediate space is formed between the base panels; and
- a plurality of microsheet elements received in the intermediate space, wherein each microsheet element has an opaque sheet section having a lighting front side and/or a lighting rear side, and wherein each microsheet element is arranged by means of a fastening section at the marginal side in the manner of a hinge on the base panel at the front side or on the base panel at the rear side such that each sheet section, starting from a light impermeable closed position, is pivotable about a horizontal pivot axis in the direction of the upper side or the lower side into at least one light permeable open position.

The core idea of the invention comprises providing a large variety of design possibilities relating to the lighting effect of the light module in accordance with the invention in that the rear side of the sheet sections of the microsheet elements also has a dedicated lighting function beside the front side and in that the arrangement of the microsheet elements at the base panel at the front side or the rear side enables different characteristics relating to the light guiding effect of sunlight incident on the module in combination with a selectable pivot direction of the sheet sections. That side is called the front side here that is exposed to toward the front side of the module in the closed position of the sheet section. On an arrangement of the module in accordance with its intended purpose on building glazing, the front side is thus visible from outside the building in the closed position of the sheet section and the rear side is visible within the respective building room. The configuration and arrangement of the microsheet elements of a module are here preferably unitary, with generally a variation within the module also being able to be present in this respect.

The sheet sections preferably have a uniformly rectangular contour and size, with generally more complex contours or size relationships also being able to be suitable by which a substantially full surface coverage of the base panels aligned in a plane parallel manner with one another can be implemented. The microsheet elements have a layer structure that comprises at least one opaque layer. In the closed position of all the sheet sections in which they are aligned in a substantially plane parallel manner with respect to the base panels, the module is thus light impermeable, for example, sunlight cannot then radiate into the building interior through an associated window. In addition to an opaque layer, the microsheet elements typically have further layers with different optical properties, in particular to form the lighting front sides and rear sides of the sheet sections.

In particular, the front side and/or the rear side of the sheet sections has/have a mirror effect for visible light and/or near infrared (NIR), with the front side and/or the rear side in particular being formed as a mirror coating of a metal. The lighting function of the mirror coated front or rear sides lies primarily in the light guidance of incident sunlight into the building interior i.e. into the room arranged behind the respective module. Depending on the arrangement of the microsheet elements at the base panel at the front side or at the rear side and in dependence on the pivot direction of the sheet sections, either the front side or the rear side of the sheet sections serves this purpose. In a module from the prior art (Hillmer et al., Journal of Optical Microsystems 1, 014502 (2021)), the microsheet elements are arranged at the base panel at the front side and the mirror coated front side of the sheet sections is exposed to the front side of the module in the closed position, whereby an unwanted disruption of the surrounding traffic due to high light reflection can take place in a practical use at a building facade. This can be avoided in accordance with the invention in that the rear side of the sheet sections has the desired mirror effect and the pivoting takes place, starting from the closed position, in the direction of the lower side of the module. The front side facing the traffic in the closed position is not involved in the light guidance of sunlight into the building interior in such an embodiment and consequently does not have to have any mirror effect so that an unwanted dazzling of the traffic is suppressed. It is therefore in particular expedient to selectively provide the front side or the rear side of the sheet sections with a mirror effect and to associate a lighting function deviating therefrom to the respective other side of the sheet sections.

The front side and/or the rear side of the sheet sections, for example, has/have a scattering effect for visible light, with the front side and/or the rear side in particular having an expedient surface roughness. An expedient scattering effect is present when incident light is not subject to a directed reflection, but rather to a diffuse reflection so that a pronounced mirror effect of the microsheet elements is suppressed. Such a lighting effect of the microsheet elements can in particular be desired when the sheet sections are moved into the closed position under strong solar radiation, but, viewed form the outside, no mirror effect may arise that could, for example, dazzle the surrounding traffic. A matt appearance of the darkened glazing is also typically more pleasant than an extensive mirror effect for persons in the building interior.

In a further embodiment, the front side and/or the rear side of the sheet sections has/have an absorption effect for visible light and/or near infrared, wherein the front side and/or the rear side in particular has/have a photovoltaic layer system and the module is in particular configured for photovoltaic energy generation. The absorbing photovoltaic layer system is preferably arranged on the front side of the sheet sections that is exposed to the outside, i.e. in the direction toward the incident sunlight, in the closed position of the sheet sections. Intense solar radiation at midday that is to be kept out of the rooms by closing the microsheet elements can thus, for example, be effectively used for photovoltaic energy generation. The module in accordance with the invention thus, for example, enables a combination of a reflective light guiding effect of the rear sides of the sheet sections for the interior space illumination by a photovoltaic function of the front sides and a simultaneous avoidance of reflections that could disrupt traffic so that the antagonism in this respect in systems for the design of building facades in accordance with the prior art can here be overcome.

In a further embodiment, the front side and/or the rear side of the sheet sections is/are configured to generate a dedicated color impression, in particular by means of a dielectric coating. In this embodiment, the module can serve as a design element of the building facade, i.e. the lighting effect is in the generation of a specific color impression for an observer. For example, color patterns can also be generated by a plurality of modules that differ with respect to the color properties that can additionally also be dynamically generated due to the actuability of the individual microsheet elements. The respective side of the sheet sections can, for example, be configured as an interference mirror based on a dielectric single or multiple coating. Alternatively, suitable color pigments or nanoparticles can be applied by means of a coating. The color impression is produced either by interference or absorption of a portion of the white solar spectrum.

The microsheet elements in particular each have a layer structure that comprises at least one compressive-stressed layer and one tensile-stressed layer, with a compressive-stressed compensation layer being arranged on the tensile-stressed layer along the sheet section of each microsheet element such that every microsheet element is divided into the following sections:

- the sheet section that is globally stress-free and has two substantially plane-parallel surfaces;
- the fastening section at the marginal side that is rigidly arranged on one of the base panels; and
- a hinge section disposed therebetween that has a curvature induced by residual stress, whereby an open position of, the microsheet element is formed.

In the absence of an external actuation the microsheet elements are in a maximum open position in this respect that is produced due to the residual stresses that are present by a curvature of the hinge section between the fastening section fixed in a shape matched manner on the base panel and the stress compensated sheet section. The hinge section, for example, has a curvature radius that amounts to a hundredth up to a third of the length of the longest side of the contour of the respective microsheet element.

The pivoting of the sheet sections between the closed position and the at least one open position can be actuated by means of an electrostatic operating principle, for which purpose the base panel at the front side and/or the base panel at the rear side has/have an electrically conductive layer and the sheet sections respectively have or form an electrode such that by an application of electric voltage signals between the electrodes and the associated base panel, individual microsheet elements and/or groups of microsheet elements can be actuated.

Each microsheet element in particular has at least one electrically conductive layer, whereby an electrode layer is formed, with the associated base panel having a layer structure that comprises a transparent, electrically conductive base layer and a transparent, electrically insulating insulation layer, with the fastening section of each microsheet element being arranged on the insulation layer.

The sheet section in the maximum opened position is, for example, aligned substantially orthogonally to the base panels. A maximum light transmission is present in such a perpendicular position and this position is adopted when the microsheet elements are not subject to any electrostatic force by an applied electric voltage so that the hinge sections are curled purely in accordance with their residual mechanical stresses.

Further intermediate positions that represent corresponding gray values with respect to the degree of transmission can preferably be adopted between the maximum open position and the closed position of the sheet sections. Starting from the maximum open position of the sheet sections, a continuous closing of the microsheet elements can take place by applying a continuously increasing electric voltage between the base panel and electrodes up to a limit voltage from which onward the microsheet elements fully close. This variety of opening angles of the sheet sections, that can be set in a dedicated manner, can in particular be used for the direct light guidance by mirror coated sheet sections.

On application of an actuation voltage, electric field lines extend both from the rear side and from the front side of the microsheet elements to the conductive base layer. The fastening section of each microsheet element has a dielectric shielding layer in an advantageous embodiment to prevent an unfolding of the sheet sections against the elastic restoring force of the hinge sections on the wrong side. The purpose of this shielding layer is to contribute to an expansion of the actuable pivot range of the sheet section to angular ranges of more than 90°, for example to 120°. The maximum open position is adopted in a state without an applied electric voltage and is determined by the degree of the curvature of the hinge section. If the sheet section in the maximum open position is pivoted by more than 90° with respect to the closed position in which the sheet section contact the base panel in a plane parallel manner, an electrostatic attraction is produced between the base layer of the base panel and the sheet section on application of an electric actuation voltage that is directed to a further pivoting open of the microsheet element and that thus counteracts the intended actuation logic. To contribute to the reduction of the electric field strength and thus to the parasitic attractive force, the dielectric shielding layer is arranged in the fastening section between the base layer and the sheet section pivoted thereabove. Furthermore, in embodiments having a photovoltaic layer system, the potential relationships can be selected by an expedient orientation of the n doped and p doped layers such that the electric field strength is further attenuated at the corresponding side of the sheet sections. The expansion of the pivot range of the sheet section that can be implemented by these measures enables a particularly comprehensive utilization of the lighting functions of the front and rear sides.

The front side and/or the rear side of the sheet sections, for example, has/have a photovoltaic layer system on the electrode layer, in particular a p-n junction based on organic or inorganic semiconductors. Connection semiconductors such as CuInGaSe2, CdTe, CdSe, GaAs or CdInGaSe represent suitable materials, for example, and can be deposited by thin film deposition processes. The photovoltaic layer system is preferably implemented on the front side of the sheet sections, i.e. facing the sunlight in the closed position. In principle, however, the rear side can also be configured for photovoltaic energy generation and can absorb indirect sunlight or artificial light used in the associated room.

The microsheet elements preferably have a rectangular contour having an edge length of 10 micrometers up to 2 mm and/or they are arranged in a regular matrix shape of parallel rows and parallel columns, with the totality of the microsheet elements in particular forming a substantially full surface coverage of the base panels in the closed state.

In an advantageous embodiment, the module in accordance with the invention has an addressing network of planar lines that form electrical connections between the electrode layers and/or the photovoltaic layers of individual microsheet elements or of groups of microsheet elements and a module interface at the marginal side for the computer controlled addressing and actuation of the microsheet elements and/or for tapping a photovoltaically generated voltage. Such an addressing network together with a module interface allows the use of a remotely disposed control device for controlling the individual microsheet elements and in particular an integration of a plurality of modules in accordance with the invention in a system for designing a building facade using a single central control device for the total system. Alternatively, the use of a plurality of decentralized control devices can also be sensible, for example if the floors of an equipped building are occupied by different parties and they want a respective individual system controller.

The present invention further relates to a system for designing a building facade, in particular glazing, at least comprising a plurality of lighting modules in accordance with the invention in accordance with one of the aforesaid embodiments and at least one control device electrically connected to the modules for the actuation of the microsheet elements of the modules, with provision being made relating to the arrangement of the modules to orient the rear side of the modules at the top side in the direction of the building interior and the upper side of the modules. The front side of the modules is then exposed to direct or indirect solar radiation and the rear side facing the room behind it on application to glazing. It must be pointed out or reasons of completeness that reference is made to the field of gravity of the earth by the position designation "at the top side", i.e. the upper side of the modules has a greater distance from the ground than the respective lower side in the provided arrangement at the building facade.

The configuration of the modules of the system in accordance with the invention relating to the arrangement of the microsheet elements, the pivoting direction, and/or the lighting effect of the front sides and rear sides of the sheet sections is in particular adapted to the lighting demands of the building facade, the building location, and the orientation of the building facade with respect to the cardinal directions. The modules, for example, have individually differing configurations so that the modules are adapted to the lighting demands of the respective associated section of the building facade. It may be necessary, for example, to suppress an outwardly directed mirror effect of the modules in a closed position of the microsheet elements for certain sections of the building facade, for instance to avoid dazzling surrounding traffic, or the equipping of the building facade with photovoltaically active modules is restricted to those facade sections that are exposed to the south, east, and west.

In addition to the guidance and the photovoltaic utilization of visible sunlight, the system in accordance with the invention is also configured for the manipulation of radiation from the near and middle infrared spectrum and can thus expediently be used for the heat management of the building. Closed modules can, for example, contribute to retaining heat radiation from the building interior at night or in the winter, in particular by a mirror effect.

BRIEF DESCRIPTION OF THE DRAWINGS

Further measures improving the invention will be shown in more detail in the following together with the description of preferred embodiments of the invention with reference to the Figures. There are shown.

DETAILED DESCRIPTION OF THE INVENTION

Figure 1A:
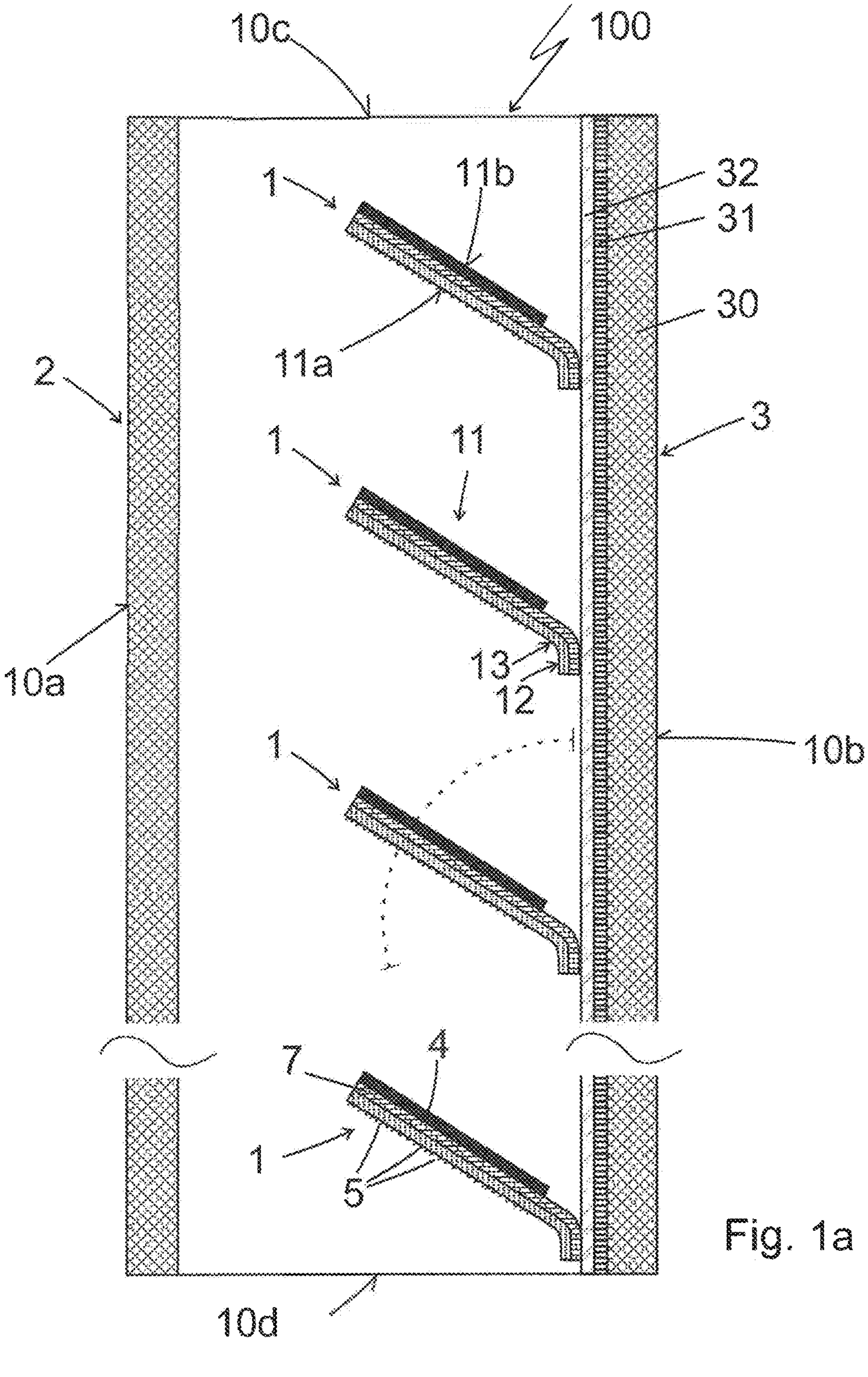
FIGS. 1*a*-1*d* schematic cross-sectional views of embodiments of the lighting module in accordance with the invention.
Figure 1B:
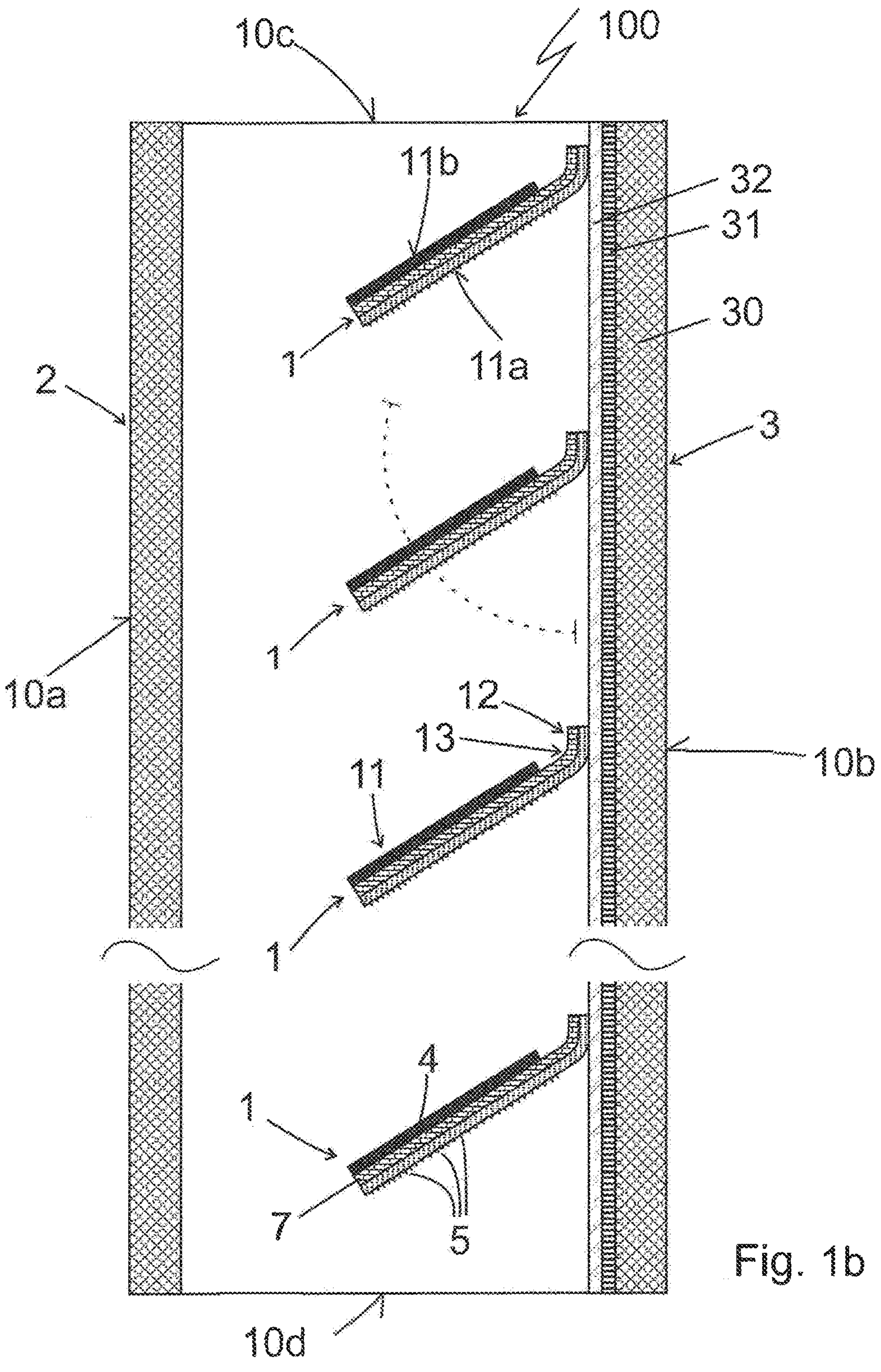

FIGS. 1*a*-1*d* show schematic cross-sectional views of four different embodiments of the lighting module 100 in accordance with the invention that each comprise the base panel 2 at the front side and the base panel 3 at the rear side and a plurality of microsheet elements 1 that are received in the intermediate space between the base panels 2, 3. With respect to a provided arrangement at a building facade, in particular for glazing, the module 100 has the front side 10*a* and the rear side 10*b* as well as the upper side 10*c* and the lower side 10*d*. Provision is made to arrange the module 100 at the building facade such that the upper side 10*c* is arranged at the top and the rear side 10*b* is oriented toward the building interior. The base panel 2 at the front side and typically also the base panel 3 at the rear side are transparent here.

The microsheet elements 1 each comprise the planar sheet section 11, the fastening section 12 arranged on the respective base panel 2, 3, and the interposed hinge section 13. The sheet sections are shown in a partially open position, with the pivot range being drawn by the dotted arc and amounting to approximately 120° by way of example starting from the closed position in which the sheet sections 11 contact the associated base panel 2, 3 in a plane parallel manner. The pivot movement takes place about a horizontal pivot axis that is here perpendicular to the plane of the Figure. Alternatively, the pivot range can be restricted, for example, to approximately 90° so that a maximum degree of transmission for light incident perpendicular on the base panels 2, 3 is present in the deenergized state of the actuation means.

The actuation of the microsheet elements 1, i.e. the pivoting of the sheet section 11, takes place by applying an electric voltage between the electrically conductive electrode layer 7 and the respective electrically conductive base layer 21, 31. The latter is arranged on a transparent carrier 20, 30 and is electrically separated by the insulation layer 22, 32.

The sheet sections 11 each have a mirror coating 4, in particular of metal, having a mirror effect for visible light and near infrared (NIR) and a dedicated surface roughness 5 with a scattering effect for visible light disposed opposite. Depending on the position of the sun and the position of the sheet sections 11 an expedient light guidance into a building room can take place by means of the mirror coating 4. High reflectivity for NIR radiation moreover contributes to heat regulation; for example, room heat irradiated though a facade window can be reflected back into the building.

The four embodiments shown differ with respect to the arrangement of the microsheet elements 1 at the base panel 2 at the front side or at the base panel 3 at the rear side and with respect to the respective pivot direction of the sheet sections 11 that are pivotable, starting from a light impermeable closed position, in the direction of the upper side 10*c* or of the lower side 10*d* of the respective module 100.

In FIG. 1*a*, the microsheet elements 1 are arranged on the base panel 3 at the rear side and the sheet sections 11 are pivotable, starting from a light impermeable closed position in which the respective sheet section 11 contacts the base panel 3 at the rear side in a plane parallel manner, in the direction of the lower side 10*d*. The lighting front side 11*a* of the sheet sections 11 has the surface roughness 5 and the lighting rear side 11*b* is respectively configured as the mirror coating 4 that has a mirror effect for visible light and NIR. In the closed position of the sheet sections 11, sunlight irradiated through the base panel 2 at the front side is scattered by the front sides 11*a* so that no glare effect is produced by reflective reflections for an observer from the side of the base panel 2 at the front side. In the open position of the sheet sections 11, incident sunlight is reflectively reflected at the rear side 11*b* and is irradiated through the base panel 3 at the rear side into a building room disposed behind it, whereby a desired light guidance effect can be achieved.

In the embodiment of FIG. 1, the microsheet elements 1 are likewise arranged on the base panel 3 at the rear side; starting from the closed position, the pivoting of the sheet sections 11 takes place here in the direction of the upper side 10*c*. The front sides 11*a* of the sheet sections 11 oriented in the closed position toward the base panel 2 at the front side are formed by the mirror coating 4 and the rear sides 11*b* have the surface roughness 5.

Figure 1C:
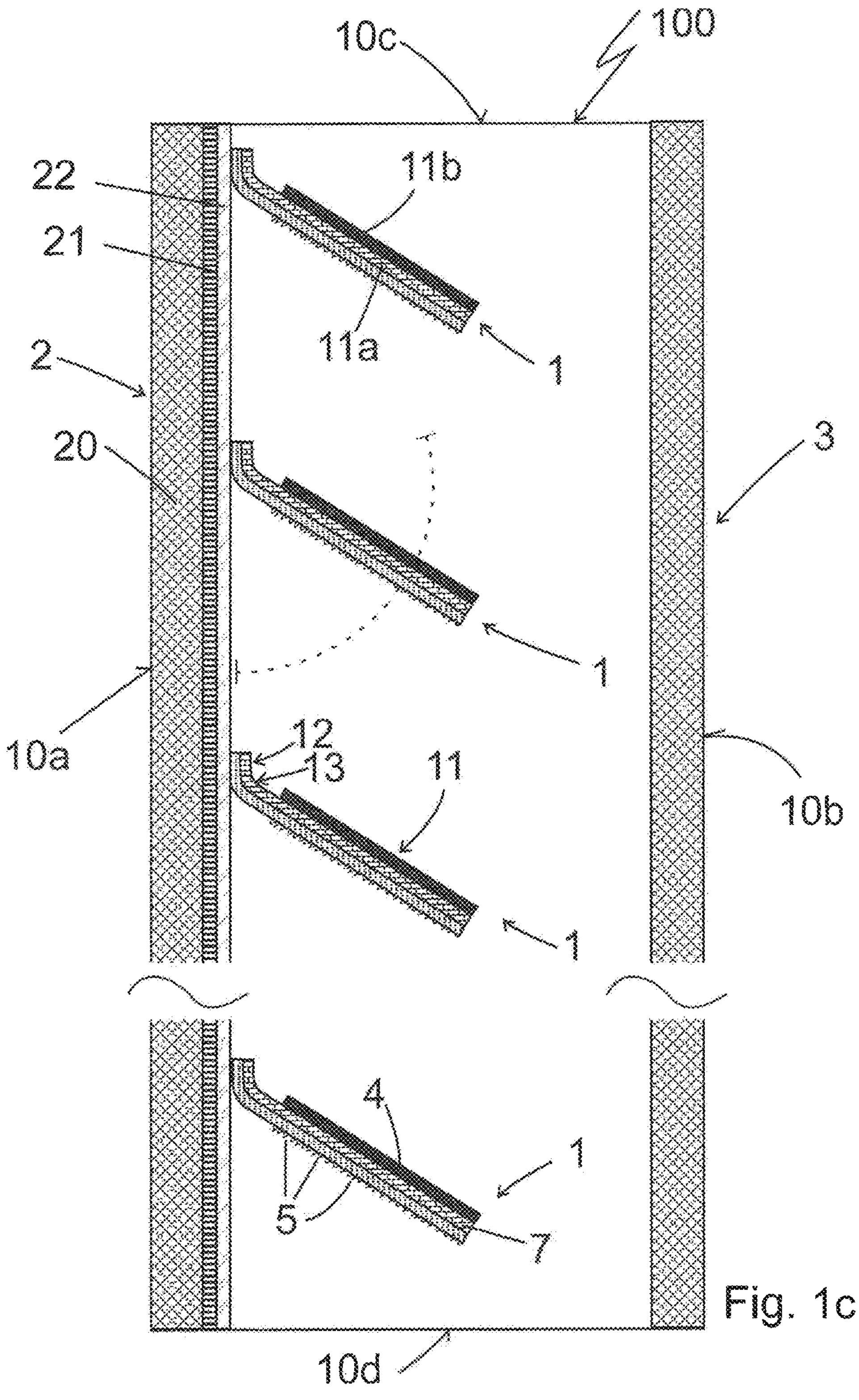
Figure 1D:
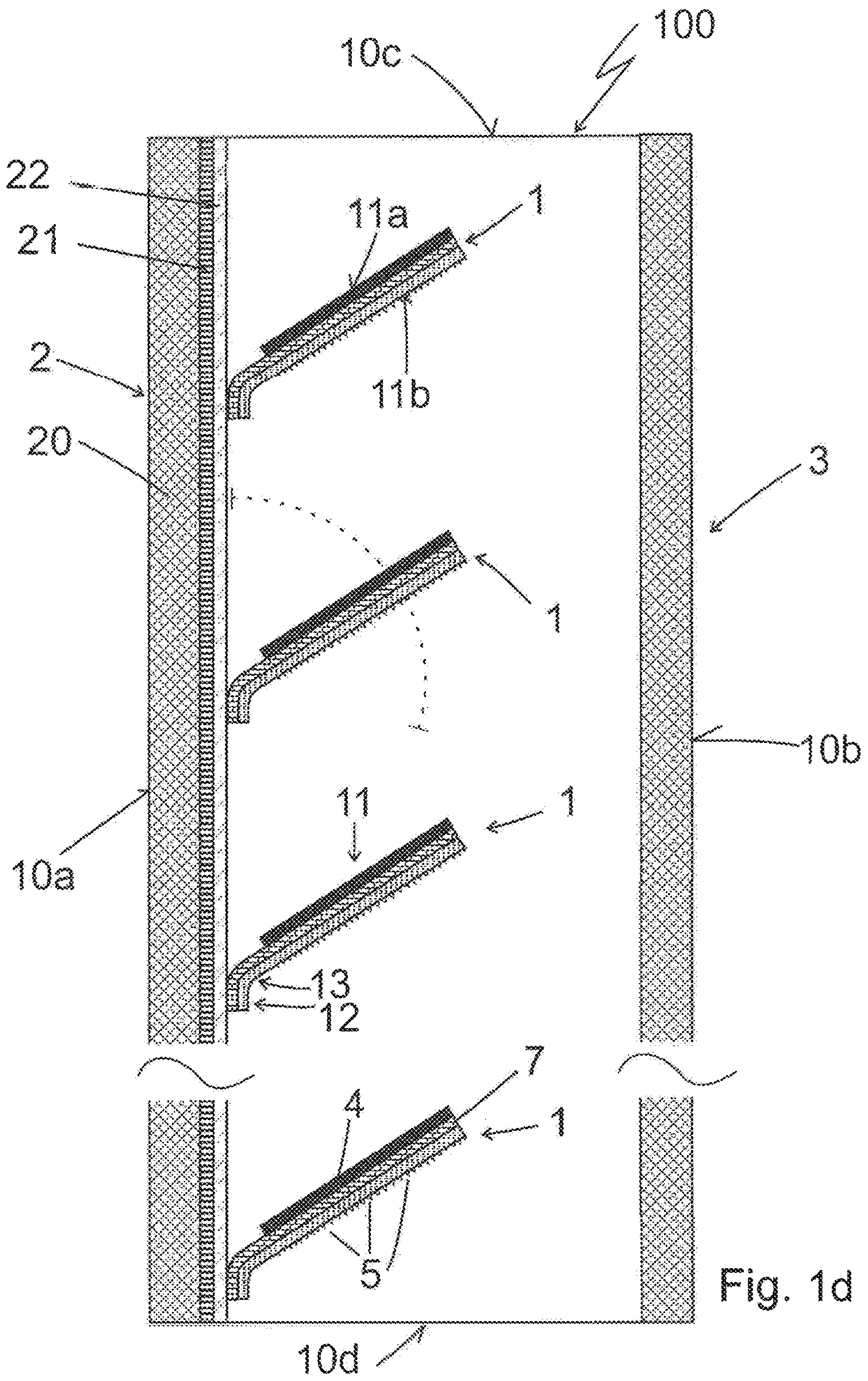

In the embodiments of FIGS. 1*c* and 1*d*, the microsheet elements 1 are each arranged at the base panel 2 at the front side of the modules 100, with the pivot direction of the sheet sections 11 being oriented in the direction of the upper side 10*c* in the case of FIG. 1*c* and in the direction of the lower side 10*d* in the case of FIG. 1*d*, starting from the closed position in which the sheet sections 11 respectively contact the base panel 2 at the front side. In the embodiment of FIG. 1*c*, the front side 11*a* of the sheet sections 11 has the surface roughness 5 and the rear sides 11*b* are configured as the mirror coating 4. The circumstances are reversed in the embodiment of FIG. 1*d*.

The configurability of the modules in accordance with the invention relating to the arrangement of the microsheet elements 1 at the base panels 2, 3 at the front side or rear side and relating to the pivot orientation of the sheet sections 11 in combination with an association of dedicated lighting functions both to the front side 11*a* and to the rear side 11*b* of the sheet sections 11 creates a high degree of adaptability and individualization ability of the modules 100 with respect to the respectively specifically present arrangements of the associated section of the building facade designed with the modules 100.

The modules 100 shown in FIGS. 1*a*-1*d* are furthermore suitable for the achieving of a color effect, in particular on that side of the sheet sections 11 that have the scattering effect. The respective surface is to be interspersed with color pigments or nanoparticles for this purpose and/or to be coated with dielectric interference filters.

FIGS. 2*a*-2*d* show schematic cross-sectional view of four further embodiments of the lighting module 100 in accordance with the invention whose microsheet elements 1 respectively have a combination of a mirror coating 4 and an oppositely disposed photovoltaic layer system 6. With respect to the arrangement of the microsheet elements 1 at the base panels 2, 3 and with respect to the pivot orientation of the sheet sections 11, the circumstances are analogous to the embodiments of FIGS. 1*a*-1*d* above.

The photovoltaic layer system 6 has an absorption effect for visible light, UV radiation, and, in part, for NIR and the modules 100 are thus configured for photovoltaic energy generation. The photovoltaic layer system 6 comprises by way of example two connection semiconductor layers 61, 62, in particular inorganic II-VI connection semiconductors, III-V connection semiconductors, or III-IV-V connection semiconductors between which there is a p-n junction.

Figure 2A:
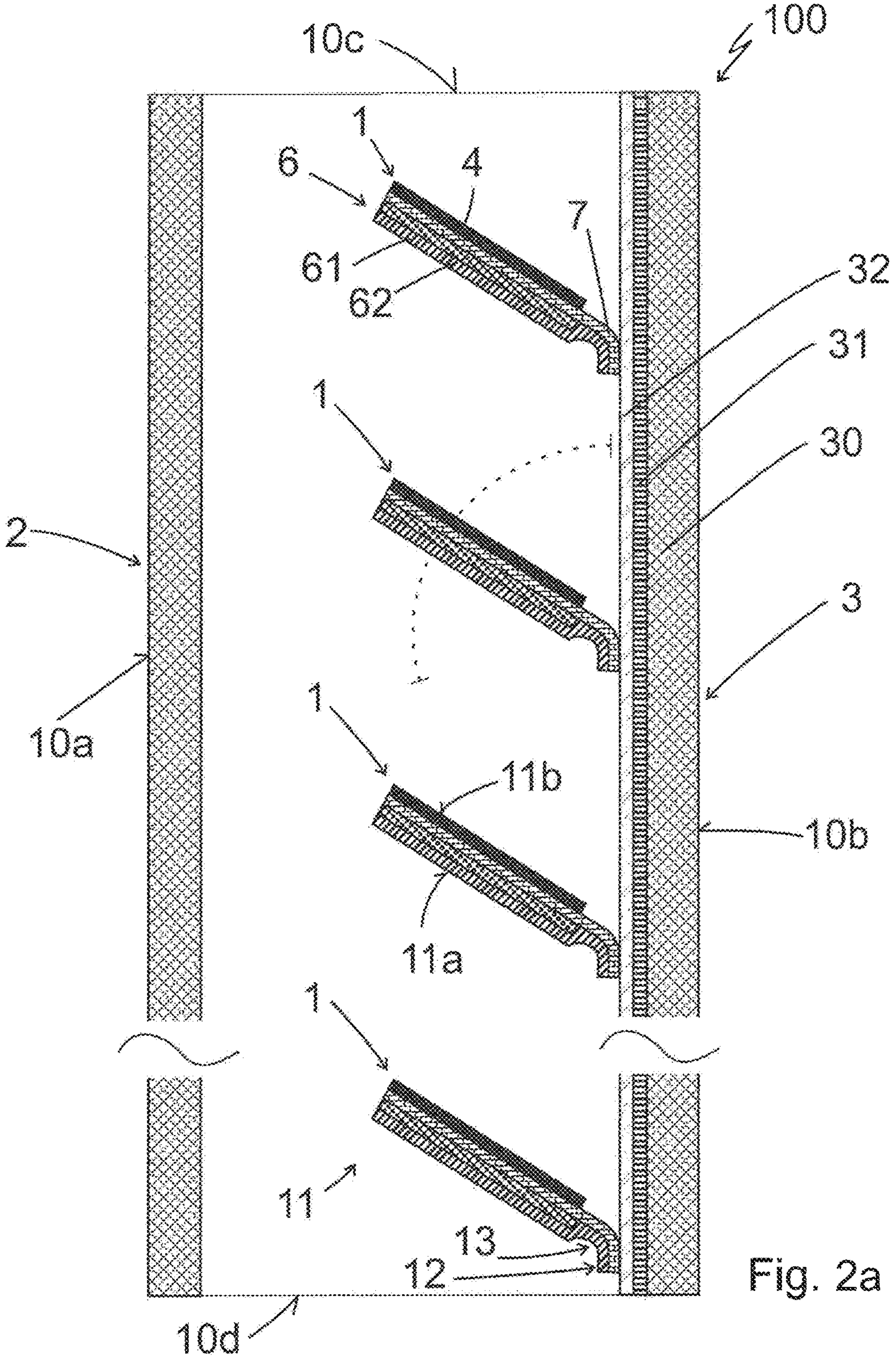
FIGS. 2*a*-2*d* schematic cross-sectional views of embodiments with a photovoltaic layer system.
Figure 2B:
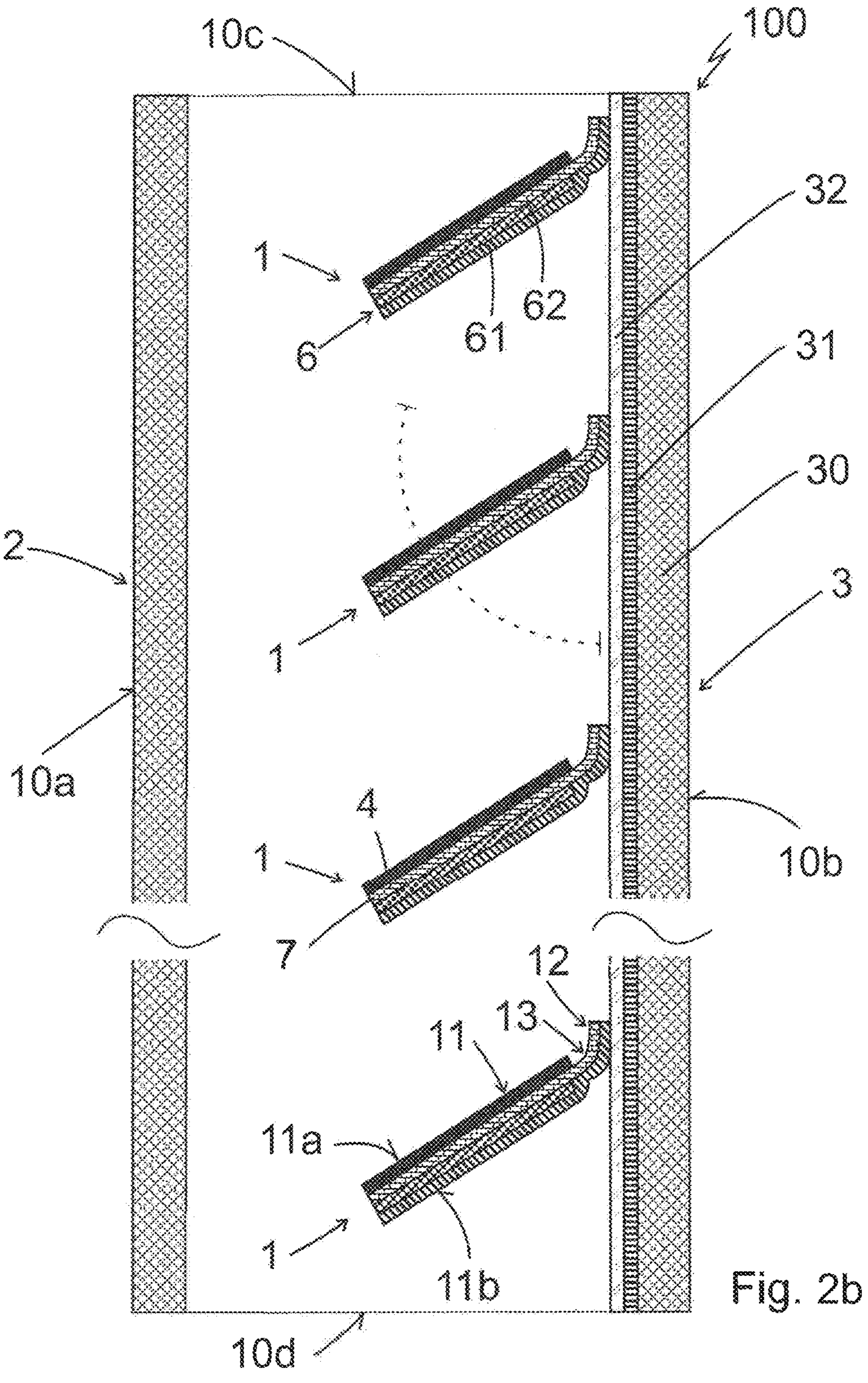
Figure 2C:
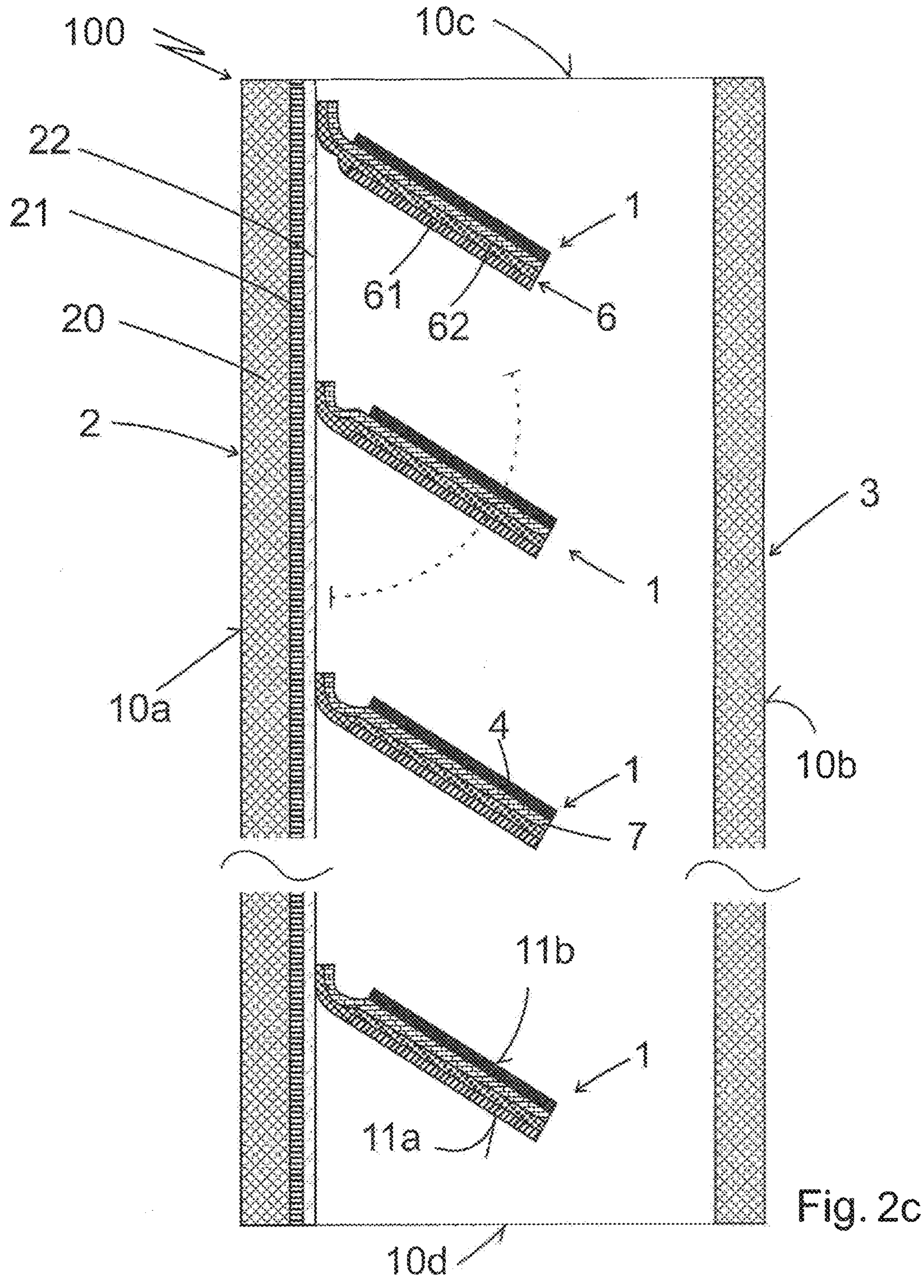
Figure 2D:
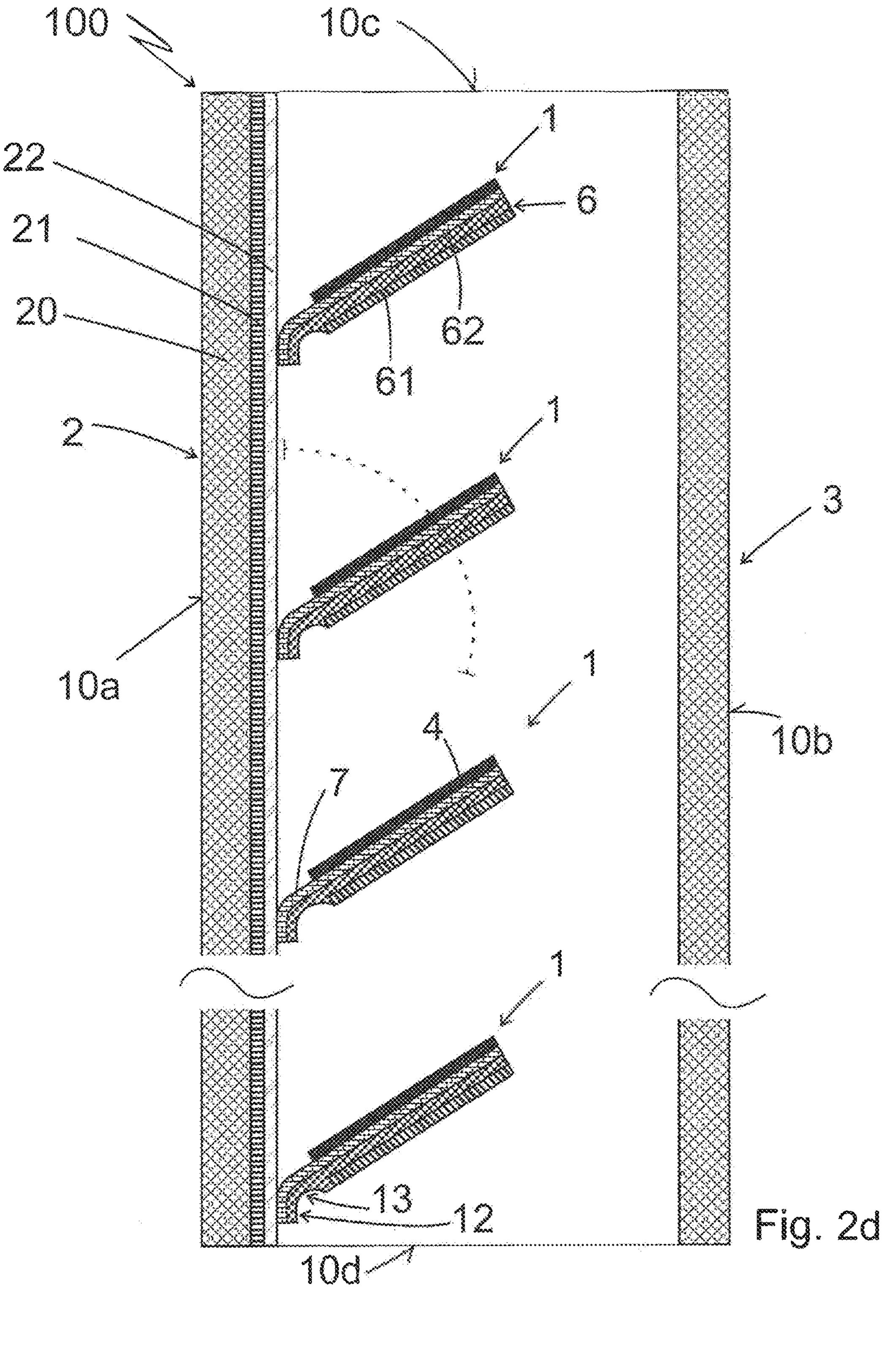

The embodiments of FIGS. 2*a* and 2*c*, in which the photovoltaic layer system 6 is respectively arranged on the front side 11*a* of the sheet sections 11 that is exposed to the base panel 2 at the front side and thus to the irradiated sunlight in the closed position of the sheet sections 11, are suitable for effective photovoltaic energy generation. In an arrangement of the photovoltaic layer system 6 on the rear side 11*b* of the sheet sections 11*a* as in the embodiments of FIGS. 2*b* and 2*d*, the modules 100 substantially act as energy converters for indirect sunlight scattered by the ground and for artificial light irradiated from the associated building room through the base panel 3 at the rear side.

Figure 3:
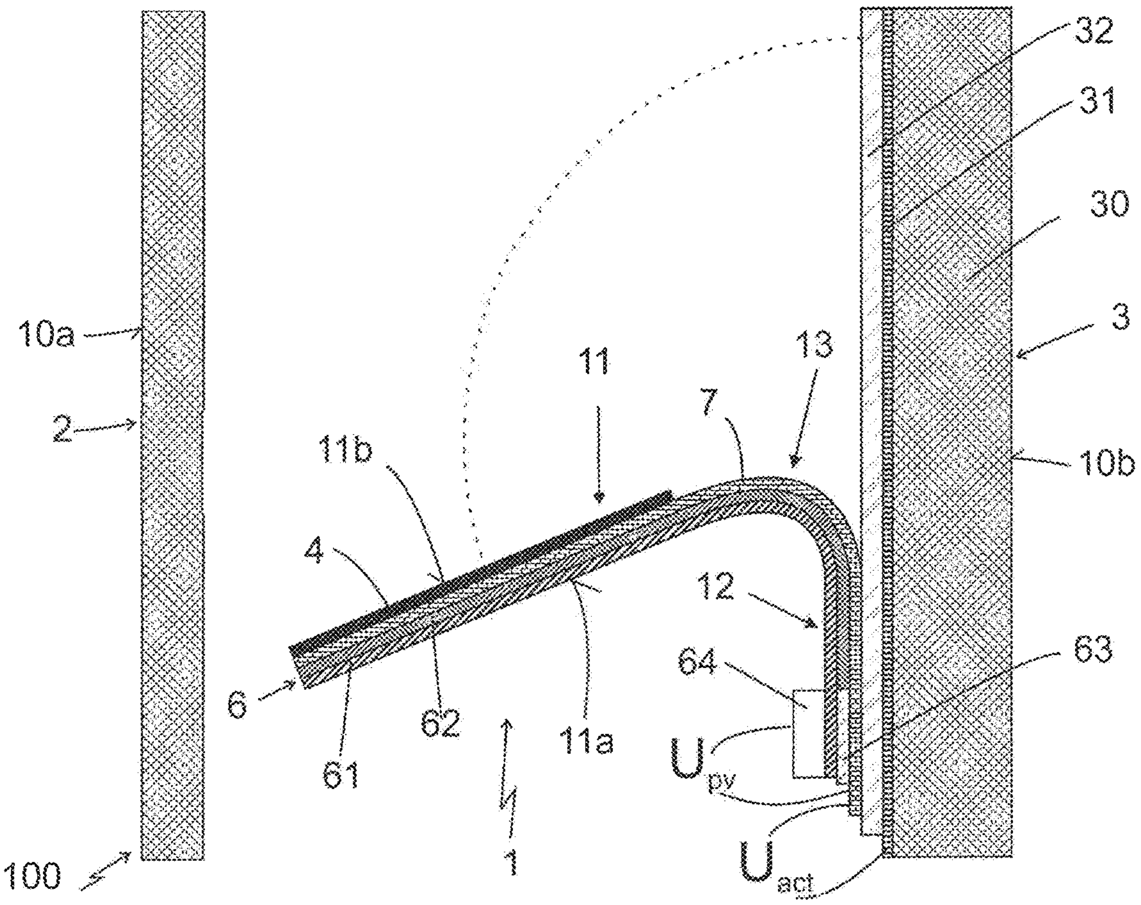
FIG. 3 a schematic cross-sectional view of an embodiment with a photovoltaic layer system.

FIG. 3 shows a detailed schematic cross-sectional view of an embodiment of the module 100 in accordance with the invention having a photovoltaic layer system 6. The microsheet element 1 shown has a layer design with the photovoltaic layer system 6 comprising the connection semiconductor layers 61, 62 on the front side 11*a* with the metallically conductive electrode layer 7 and the mirror coating 4 applied to the rear side 11*b* along the sheet section 11.

The microsheet element 1 is arranged on the base panel 3 at the rear side that comprises the transparent, electrically conductive base layer 31 and the transparent, electrically insulating insulation layer 32. An electric voltage $U_{pv}$ formed at the p-n junction of the photovoltaic layer system 6 can be tapped in the fastening section 12 of the microsheet element 1 between the electrode layer 7 and the electrode 64 at the upper side.

The electrode layer 7 in particular additionally acts in the hinge section 13 as an electrode for the electrostatic actuation of the microsheet element 1, for which purpose an electric voltage $U_{act}$ is applied between the electrode layer 7 and the base layer 31. Electrical surface charges can be inducted in the sheet section 11 on the mirror coating 4 forming the rear side 11*b* and on the semiconductor layer 61 forming the front side 11*a*.

In the state shown in FIG. 3, the sheet section 11 adopts a wide-open position that differ by more than 90° from the closed position. In this state, a significant attractive force occurs between the front side 11*a* and the base layer 31 on the application of an actuation voltage $U_{act}$ that opposes the attraction force between the electrode layer 7 in the hinge section 13 and the base layer 31. The attraction force between the front side 11*a* and the base layer 31 thus opposes the pivoting of the sheet section 11 into the closed position and represents an impediment to the intended actuation. To attenuate the electric field between the front side 11*a* and the base layer 31, the fastening section 12 has the dielectric shielding layer 63 that is formed from an insulating material of high permittivity.

The modules 100 of all the embodiments preferably have addressing networks, not shown here, of electrical leads that form electrical connections between individual microsheet elements 1 or groups of microsheet elements 1 and a module interface at the marginal side for the computer assisted addressing and actuation of the microsheet elements 1 and/or for the tapping of a photovoltaically generated voltage Upv. The electrical leads are applied to the respective base panel as metallic thin films, for example, or are integrated in it; the electrically conductive base layer 21, 31 can in particular also be microstructured, i.e. be divided into mutually independently electrically engageable sections.

The microsheet elements 1 of the embodiments shown are preferably arranged in a regular matrix shape of parallel rows and parallel columns, with the totality of the microsheet elements 1 in particular forming a substantially complete surface coverage of the base panels 2, 3 in the closed state of the sheet sections 11. For this purpose, the microsheet elements 1 preferably have a rectangular contour whose edges have a length of 10 micrometers up to 2 millimeters.

Figure 4:
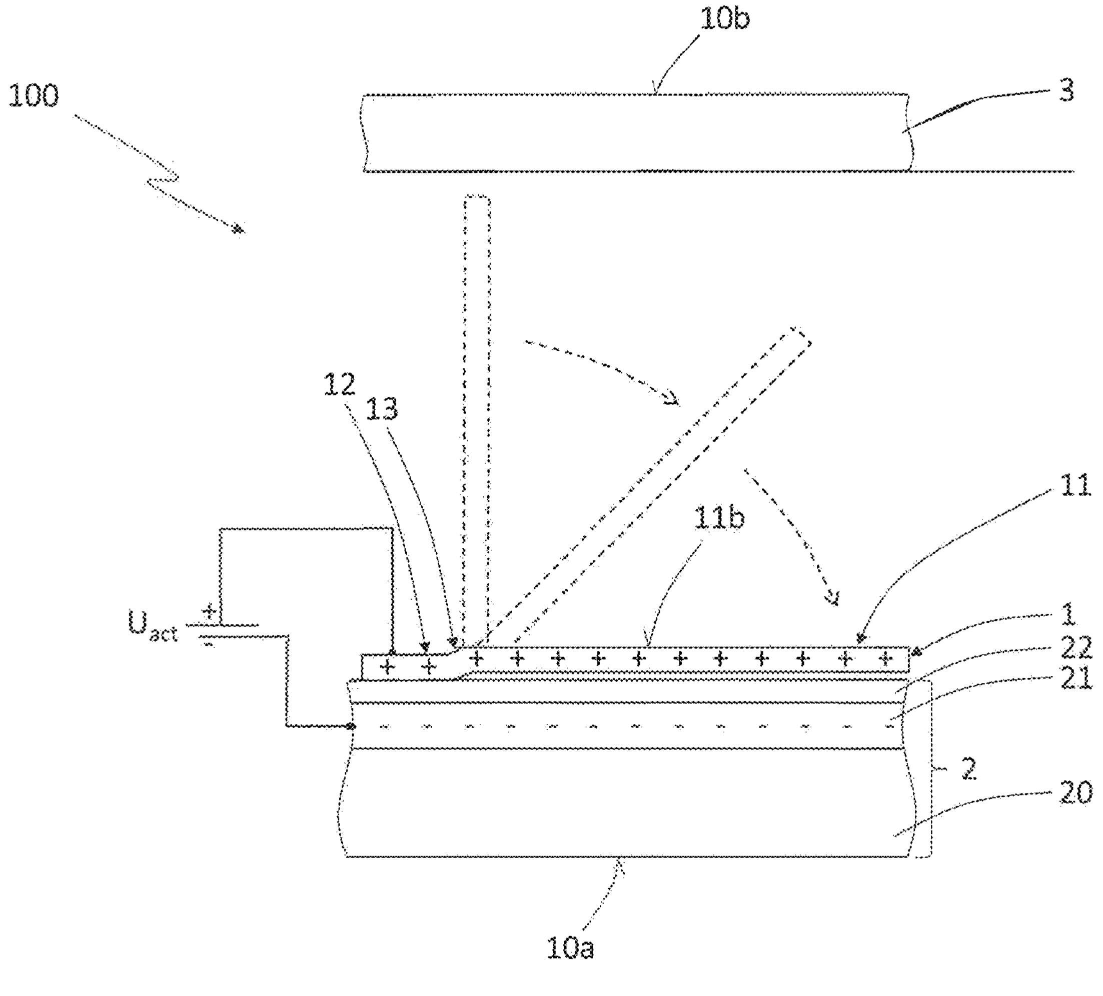
FIG. 4 a schematic cross-sectional view to demonstrate the electrostatic actuation.

FIG. 4 shows a schematic cross-sectional view of a module 100 in accordance with the invention to demonstrate the electrostatic actuation The illustration contains a single microsheet element 1 that is mounted in the intermediate space between the base panel 3 at the rear side and the base panel 2 at the rear side and is arranged on the latter. With respect to the provided arrangement at the building facade, the module 100 has the front side 10*a* and the rear side 10*b*.

The microsheet element 1 forms an electrode and has an electrically conductive electrode layer for this purpose. The specific lighting function of the front side 11*a* and the rear side 11*b* of the sheet section 11 are not shown here for reasons of clarity. The base panel 2 at the front side comprises the transparent carrier 20, the transparent and electrically conductive base layer 21, and the transparent and electrically insulating insulation layer 22 The fastening section 12 of the microsheet element 11 is arranged on the insulation layer and the pivot movement of the sheet section 11 is executed over a curvature of its hinge section 13. In the state shown in FIG. 4, an electrical actuation voltage $U_{act}$ is applied between the microsheet element 1 and the base layer 21 so that an electrostatic attraction between the base layer 21 and the microsheet element 1 results in a closing of the sheet section 11 in the shown horizontal, i.e. closed, position. Two open positions of the sheet section 11 are shown by dashed lines: a position oriented substantially orthogonally to the base panels 2, 3 that corresponds to a maximum transmission of the module 100 with a perpendicular light incidence and a half-open intermediate position in which there is an angle of approximately 45° between the sheet section 11 and the base panels 2, 3. The maximum open position is adopted when the microsheet element 1 and the base layer 21 are at the same electrical potential and there is a smaller actuation voltage $U_{act}$ in the partially open intermediate position in comparison with the closed position. A plurality of partially open intermediate positions with different angles of the sheet section 11 with respect to the base panels 2, 3 can consequently be adopted by a suitable variation of the applied actuation voltage $U_{act}$.

Figure 5:
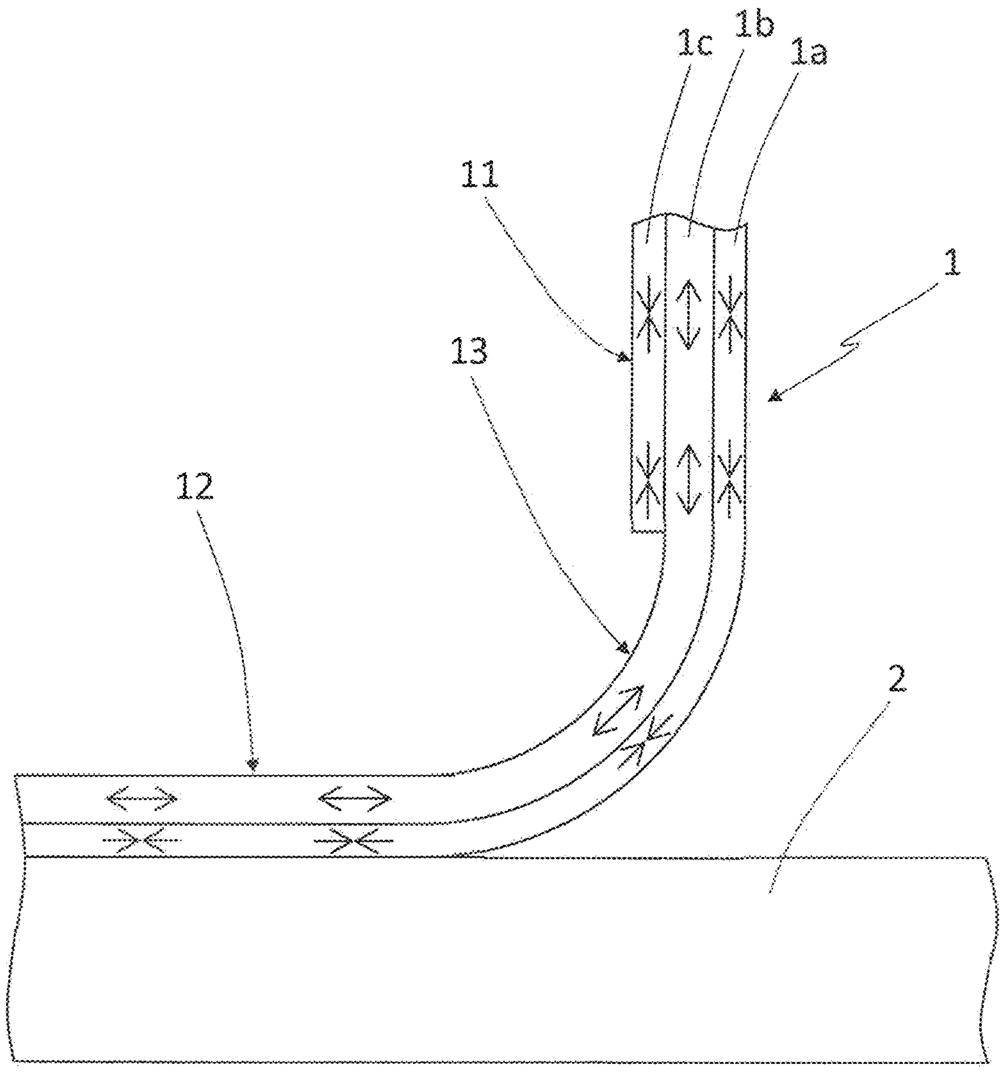
FIG. 5 a schematic cross-sectional view to demonstrate the residual stresses of a microsheet element.

FIG. 5 shows a schematic cross-sectional view of a module in accordance with the invention to demonstrate the residual stresses of a microsheet element 1. The lighting functions of the microsheet element 1 are again not shown for purposes of clarity. The microsheet element 1 has a compressive-stressed layer 1*a* and a tensile-stressed layer 1*b* arranged on the base panel 2. The effect of these residual stresses comprises the shown curvature of the microsheet element 1 along the hinge section 13, here by way of example by a curling angle of approximately 90°. This curvature is prevented along the fastening section 12 by the shape matching connection to the base panel 2, and the compressive-stressed compensation layer 1*c* provides along the sheet section 11 that the global, i.e. effectively residual stress, in the sheet section 11 disappears and thus no curvature occurs there. The layers 1*a*, 1*b*, and 1*c* shown can, for example, in their totality form the electrode layer of the microsheet element 1 and the lighting function of the microsheet element 1 is generated by unstressed layers or layer systems applied to both sides.

Typically all the layers are stressed, i.e., for example, also the photovoltaic layer system, the color layers, or the matt layers with scattering effect, in particular on a use of methods of gas phase deposition (PVD, CVD). In this case, the total layer sequence is expediently designed to compensate for the mechanical stresses in the planar sheet section 11.

Two different layers are sufficient in principle for global stress compensation in the sheet section 11. It is, however, advantageous with respect to the design freedom relating to the functionality and the dimensions of the microsheet elements to use more than two layers. In the embodiments of FIGS. 1*a*-1*d* and 2*a*-2*d*, the microsheet elements 1 are formed from three or four layers, with an even larger number of layers also being able to be expedient or necessary depending on the intended lighting or micromechanical functionality.

Figure 6:
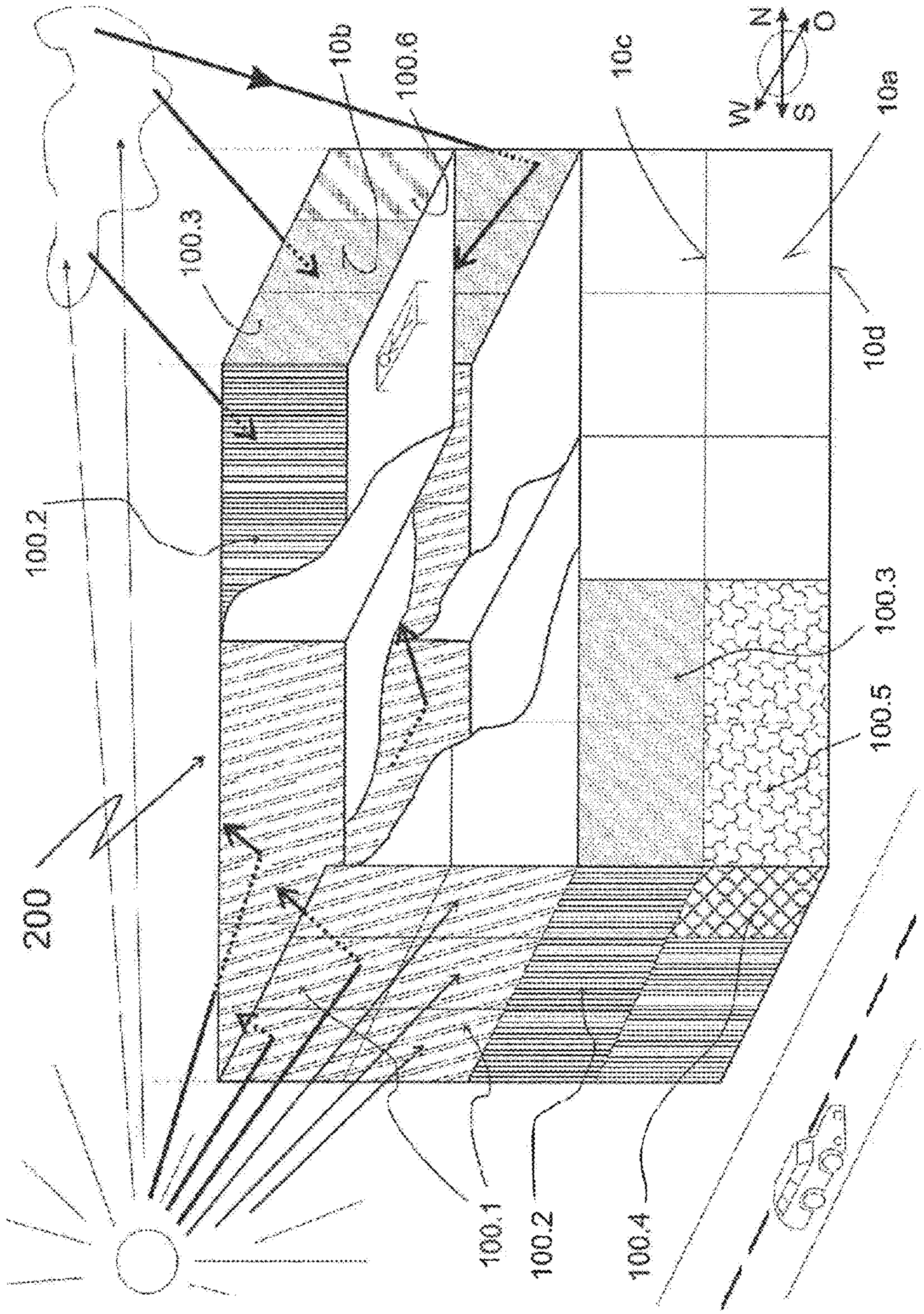
FIG. 6 a schematic view of an exemplary building facade with a system of lighting modules in accordance with the invention.

FIG. 6 shows a schematic view of a building facade having a system 200 of lighting modules 100 in accordance with the invention. The modules 100 completely clad the building facade by way of example here, with the rear sides 10*b* of the modules 100 being oriented in the direction of the building interior i.e. the front sides 10*a* are exposed to the outside, and with the upper sides 10*c* of the modules 100 being oriented to the top. The orientation of the sides 10*a*-10*d* are shown in a representative manner at two modules 100. The configuration of the modules 100 relating to the arrangement of the respective microsheet elements and to the pivot direction and the lighting effect of the front sides and the rear sides of the associated sheet sections are adapted to the lighting demands of the respective sections of the building facade. The different filling patterns of the modules 100 used for the illustration characterize the respective module configuration, but not a specific actuation situation, i.e. a position of the sheet sections of the microsheet elements. The cardinal directions matching the present embodiment are shown with respect to a schematic compass.

The most intense solar radiation is at the south front so that an ability of the modules 100 to generate photovoltaic energy can be used particularly effectively here. It must additionally be noted in the design of the system 22 that the south front is oriented toward the adjacent street so that a dazzling of traffic or "light flashes" incident in the vehicles from above or from the side due to a mirror effect emanating from the modules 100 has to be avoided.

The modules 100.1 attached in the upper floors of the south front have a photovoltaic layer system on the front side of the sheet sections of the microsheet elements and the rear sides have a mirror effect. The modules 100.1, for example, correspond to the embodiment of FIG. 2*a* in which the microsheet elements are arranged on the base panel at the rear side and the pivoting of the sheet sections takes place, starting from the closed position, in the direction of the lower side 10*d*. The photovoltaic layer system acts as light absorbing so that no glare due to a mirror effect occurs for passersby and in particular for traffic. The sheet sections of the modules 100.1 are present in a partially open position by way of example so that a light guidance of the incident sunlight into the rooms located behind the facade takes place.

Very generally, the actuation of the microsheet elements, i.e. the position of the sheet sections is typically adapted continuously to the position of the sun and the user requirements over the course of the day. A completely closed or partially closed position can, for example, be adopted at lunch time, whereby the interior space is fully or almost fully shaded and an efficient solar exposure of the photovoltaically active front sides of the sheet sections is simultaneously present. In this respect, a completely closed position does not typically correspond to the optimum with respect to the photovoltaic energy generation since the angle of incidence of the solar rays on the front side of the modules can differ greatly from 90°. A partially open position of the sheet sections while forming an angle of 90° with the incident solar rays is, however, not necessarily optimum since in this case adjacent microsheet elements can shield one another. The optimum of a maximum photovoltaic efficiency is rather between the aforesaid positions and the actuation of the microsheet elements can preferably be controlled and regulated by means of the control device such that the available sunlight is always optimally used over the course of the day.

The modules 100.2 have a photovoltaic layer system on the front side of the sheet sections of the microsheet elements and the rear sides have a scattering effect. Microsheet elements are, for example, arranged on the base panel at the front side and the pivoting of the sheet sections takes place, starting from the closed position, in the direction of the lower side 10*d* of the modules 100.2. In a closed position of the sheet sections, the scattering effect of the rear sides effects a matt optical impression for a user in the associated room, i.e. in contrast to the case of the modules 100.1, there is no extensive mirror effect here that could be felt to be discomforting in certain rooms, in particular in publicly used areas. Alternatively, an inwardly directed mirror effect may be desired, for example in the manner of a mirrored room of a restaurant, whereby an enlarged impression of the room and a better illumination can be achieved.

The modules 100.3 attached to the east front have a mirror effect on the front side of the sheet sections of the microsheet elements and a scattering effect on the rear side. The modules 100.3, for example, correspond to the embodiment of FIG. 1*d* in which the microsheet elements are arranged on the base sheet at the front side and the pivoting of the sheet sections takes place, starting from the closed position, in the direction of the lower side 10*d*. Due to the only low position of the sun in the east, the mirror effect cannot result in an impairment for traffic due to light reflections in the closed position of the sheet section. The modules 100.3 generate a targeted light guidance into the building interior without forming a mirror effect in the closed state viewed from there.

The modules 100.4 and 100.5 attached in the bottommost floor of the building facades generate dedicated color impressions by means of the front side of the sheet sections of the microsheet elements and the rear sides have a mirror effect. The color impressions emanating from the front sides are based, for example, on dielectric coatings or on color pigments. Such modules 100.4 and 100.5 with a color effect in particular take over a design function. Different color impressions or color patterns can be produced on every front of the building façade, for example, in particular also letters or logos.

The west front is sectionally likewise equipped with modules 100.2 for photovoltaic energy generation, i.e. with a photovoltaic layer system on the front side and with a matt rear side of the sheet sections of the microsheet elements. In the case of the room shown at the top right the sheet sections of all the modules 100.2 and of the modules 100.3 and 100.6 of the north front are moved into the closed position so that the room is in a darkened state.

The north front is irradiated by indirect sunlight that is in particular diffusely scattered by clouds or the ground (for example also by snow). A dedicated light guidance and/or photovoltaic utilization can also be sensible for this indirect light, with only a light guidance by means of the modules 100.3 being provided here by way of example that correspond to the embodiment of FIG. 1*d* and by means of the module 100.6. The module 100.6 comprises microsheet elements whose sheet sections have a mirror effect both on the front side and on the rear side. An extensive mirror can thus be formed for a user as required in addition to the light guidance effect for light incident from the outside by means of the module 100.6 in the closed position. The module 100.6 can in particular be formed as individually actuable, i.e. independently of the other modules, for this purpose.

A major application of the system 200 in accordance with the invention relates to energy savings and heat management in the building. A heating of the rooms in summer can be greatly reduced by means of the design of the building facade with the lighting modules 100 in accordance with the invention while in winter as much as possible of the valuable solar energy, including the thermal radiation, can be captured.

The invention is not restricted in its design to the preferred embodiment specified above. A number of variants is rather conceivable that also makes use of the solution shown with generally differently designed embodiments. All the features and/or advantages, including any construction details or spatial arrangements, originating from the claims, the description, or the drawings can be essential to the invention both per se and in the most varied combinations.

REFERENCE NUMERAL LIST

100 lighting module
200 system for designing a building facade
10*a* front side
10*b* rear side
10 cupper side
10*d* lower side
1 microsheet element
1*a* compressive-stressed layer
1*b* tensile-stressed layer
11 compensation layer
11*a* sheet section
11*b* front side
11*b* rear side
12 fastening section
13 hinge section
2 base panel at the front side
3 base panel at the rear side
20, 30 carrier
21, 31 base layer
22, 32 insulation layer
4 mirror layer
5 surface roughness
6 photovoltaic layer system
61, 62 connection semiconductor
63 shielding layer
64 electrode
7 electrode layer
$U_{pv}$ photovoltaic voltage
$U_{act}$ actuation voltage

The invention claimed is:

1. A lighting module for a building facade, in particular for glazing, wherein the module has a front side, a rear side, an upper side, and a lower side with respect to a provided arrangement at the building facade, the module comprising:

a base panel at the front side and a base panel at the rear side, wherein the base panels are transparent and wherein an intermediate space is formed between the base panels; and a plurality of microsheet elements, wherein each microsheet element has an opaque sheet section having a lighting front side and/or a lighting rear side, and wherein each microsheet element is arranged by a fastening section at a marginal side in the manner of a hinge on the base panel at the front side or on the base panel at the rear side such that each sheet section, starting from a light impermeable closed position, is pivotable about a horizontal pivot axis in a direction of the upper side or the lower side into at least one light permeable open position, wherein the front side and/or the rear side of each of the microsheet elements has/have a mirror effect for visible light and/or for near infrared light, and wherein the front side and/or the rear side of each of the sheet sections is configured as a mirror coating of a metal.

2. The module in accordance with claim 1, wherein the front side and/or the rear side of each of the sheet sections has/have an absorbing effect for visible light and/or near infrared, with the front side and/or the rear side of each of the sheet sections having a photovoltaic layer system and the module being configured for photovoltaic energy generation.

3. The module in accordance with claim 1, wherein the front side and/or the rear side of each of the sheet sections is configured to generate a dedicated color impression, by a dielectric coating or by color pigments.

4. The module in accordance with claim 1, wherein the microsheet elements each have a layer structure that comprises at least one compressive-stressed layer and one tensile-stressed layer, with a compressive-stressed compensation layer being arranged on the tensile-stressed layer along the sheet section of each microsheet element such that every microsheet element is divided into the following sections:

the sheet section that is globally stress-free and has two substantially plane-parallel surfaces;

the fastening section at the marginal side that is rigidly arranged on one of the base panels; and a hinge section disposed therebetween that has a curvature induced by residual stress, whereby an open position of the microsheet element is formed.

5. The module in accordance with claim 1, wherein the pivoting of the sheet sections between the closed position and the at least one open position is actuated by an electrostatic operating principle, for which purpose the base panel at the front side and/or the base panel at the rear side has/have an electrically conductive layer and the sheet sections respectively have or form an electrode such that by an application of electric voltage signals between the electrodes and the associated base panel individual microsheet elements and/or groups of microsheet elements are actuated.

6. The module in accordance with claim 1, wherein the fastening section of each microelement has a dielectric shielding layer.

7. The module in accordance with claim 1, further comprising an addressing network of electrical leads that form electrical connections between individual microsheet elements or groups of microsheet elements and a module interface at the marginal side for a computer assisted addressing and actuation of the microsheet elements and/or for tapping of a photovoltaically generated voltage.

8. The module in accordance with claim 1, wherein the lighting module is for glazing of a building façade.

9. The module in accordance with claim 1, wherein the front side and/or the rear side of each of the sheet sections has/have a scattering effect for visible light.

10. The module in accordance with claim 9, wherein the front side and/or the rear side of each of the sheet sections have an expedient surface roughness.

11. The module in accordance with claim 1, wherein each microsheet element has at least one electrically conductive layer, whereby an electrode layer is formed, with the associated base panel having a layer structure that comprises a transparent, electrically conductive base layer and a transparent, electrically insulating insulation layer, with the fastening section of each microsheet element being arranged on the insulation layer.

12. The module in accordance with claim 11, wherein the front side and/or the rear side of each of the sheet sections has a photovoltaic layer system on the electrode layer, the photovoltaic layer being a p-n junction based on organic semiconductors or inorganic semiconductors.

13. The module in accordance with claim 1, wherein the microsheet elements each have a rectangular contour having an edge length of 10 micrometers up to 2 mm and/or are arranged in a regular matrix shape of parallel rows and parallel columns.

14. The module in accordance with claim 13, wherein the microsheet elements are arranged in the regular matrix shape of parallel rows and parallel columns with a totality of the microsheet elements forming a substantially full surface coverage of the base panels in the closed state.

15. A system for designing a building facade at least comprising:

a plurality of lighting modules, each of the plurality of modules comprising:

a front side, a rear side, an upper side, and a lower side with respect to a provided arrangement at the building façade;

a base panel at the front side and a base panel at the rear side, wherein the base panels are transparent and wherein an intermediate space is formed between the base panels; and a plurality of microsheet element, wherein each microsheet element has an opaque sheet section having a lighting front side and/or a lighting rear side, and wherein each microsheet element is arranged by a fastening section at a marginal side in the manner of a hinge on the base panel at the front side or on the base panel at the rear side such that each sheet section, starting from a light impermeable closed position, is pivotable about a horizontal pivot axis in a direction of the upper side or the lower side into at least one light permeable open position; and at least one control device electrically connected to the modules for actuation of the microsheet elements of the modules, with provision being made relating to an arrangement of the modules to orient the rear side of the modules in a direction of the building interior and the upper side of the modules at the top.

16. The system in accordance with claim 15, wherein the configuration of the modules relating to the arrangement of the microsheet elements, a pivoting direction, and/or a lighting effect of the front sides and the rear sides of the sheet sections is adapted to lighting demands of the building façade.

17. The system in accordance with claim 15, wherein the modules have individually different configurations, so that the modules are adapted to lighting demands of respective associated sections of the building façade.

18. The system in accordance with claim 15, wherein the system is for designing glazing of a building façade.

19. A lighting module for a building facade, in particular for glazing, wherein the module has a front side, a rear side, an upper side, and a lower side with respect to a provided arrangement at the building facade, the module comprising:

a base panel at the front side and a base panel at the rear side, wherein the base panels are transparent and wherein an intermediate space is formed between the base panels; and a plurality of microsheet elements, wherein each microsheet element has an opaque sheet section having a lighting front side and/or a lighting rear side, and wherein each microsheet element is arranged by a fastening section at a marginal side in the manner of a hinge on the base panel at the front side or on the base panel at the rear side such that each sheet section, starting from a light impermeable closed position, is pivotable about a horizontal pivot axis in a direction of the upper side or the lower side into at least one light permeable open position, and the front side and/or the rear side of each of the sheet sections has/have a scattering effect for visible light.

20. The module in accordance with claim 19, wherein the front side and/or the rear side of each of the sheet sections have an expedient surface roughness.

* * * * *